(12) United States Patent
Queau et al.

(10) Patent No.: US 8,074,687 B2
(45) Date of Patent: Dec. 13, 2011

(54) CRYOGENIC TRANSFER HOSE

(75) Inventors: Jean-Pierre Queau, Nice (FR); Jack Pollack, Monaco (MC); Hein Wille, Eze Village (FR); Liselotte Van Dijk, Amsterdam (NL)

(73) Assignee: Single Buoy Moorings Inc., Marly (CH)

( * ) Notice: Subject to any disclaimer, the term of this patent is extended or adjusted under 35 U.S.C. 154(b) by 1015 days.

(21) Appl. No.: 11/921,855

(22) PCT Filed: May 31, 2006

(86) PCT No.: PCT/NL2006/050128
§ 371 (c)(1),
(2), (4) Date: Dec. 10, 2007

(87) PCT Pub. No.: WO2006/132532
PCT Pub. Date: Dec. 14, 2006

(65) Prior Publication Data
US 2009/0145506 A1 Jun. 11, 2009

(30) Foreign Application Priority Data
Jun. 8, 2005 (EP) .................................... 05105011

(51) Int. Cl.
*F16L 11/00* (2006.01)
(52) U.S. Cl. ........ 138/112; 138/114; 138/113; 138/109; 138/155; 285/123.1; 285/187; 285/904; 285/123.3; 62/50.7
(58) Field of Classification Search .......... 138/112–114, 138/109, 155, 120, 149, 148; 285/123.1, 285/47, 187, 904, 123.3, 123.5; 62/50.7
See application file for complete search history.

(56) References Cited

U.S. PATENT DOCUMENTS

| | | | | |
|---|---|---|---|---|
| 3,809,128 A | | 5/1974 | Tateisi et al. ................. 138/114 |
| 4,011,732 A | * | 3/1977 | Doherty et al. ............... 62/50.7 |
| 4,060,263 A | * | 11/1977 | Kotcharian ..................... 285/47 |
| 4,108,476 A | | 8/1978 | Krupp et al. .................... 285/47 |
| 4,111,466 A | | 9/1978 | Deregibus et al. ........ 285/123.14 |
| 4,315,408 A | | 2/1982 | Karl et al. ...................... 62/50.7 |
| 4,417,603 A | | 11/1983 | Argy et al. .................... 138/149 |
| 5,827,370 A | * | 10/1998 | Gu ................................ 118/715 |
| 6,134,893 A | * | 10/2000 | Bonn ............................ 62/50.7 |
| 6,682,102 B1 | | 1/2004 | Betz ............................ 138/114 |
| 2003/0217779 A1 | * | 11/2003 | Schippl ........................ 138/148 |

FOREIGN PATENT DOCUMENTS

| | | |
|---|---|---|
| DE | 40 31 879 | 4/1992 |
| EP | 27 05 361 | 8/1978 |
| EP | 0 949 444 | 10/1999 |
| WO | WO 01/96772 | 12/2001 |

* cited by examiner

Primary Examiner — Patrick F Brinson
(74) Attorney, Agent, or Firm — Young & Thompson

(57) ABSTRACT

A flexible cryogenic transfer hose for connecting two cryogenic facilities, has a length of at least 20 m, and:
an inner flexible hose with at least two segments, interconnected via at least two transverse inner connecting members,
an outer hose surrounding the inner hose and including a watertight elastomeric or composite material, the outer hose having at least two segments mutually connected via two outer connecting members, the outer hose having a wall thickness of at least 2 cm, a bend radius of at least 2 m, and an internal diameter of at least 20 cm,
the inner hose being kept at a distance from the outer hose via spacer elements bridging a distance between the outer wall of the inner hose and an inner wall of the outer hose, which distance is between 0.1 and 0.8 times the internal diameter $d_{io}$ of the inner hose.

9 Claims, 8 Drawing Sheets

CRYOGENIC TRANSFER HOSE

Figure 1:
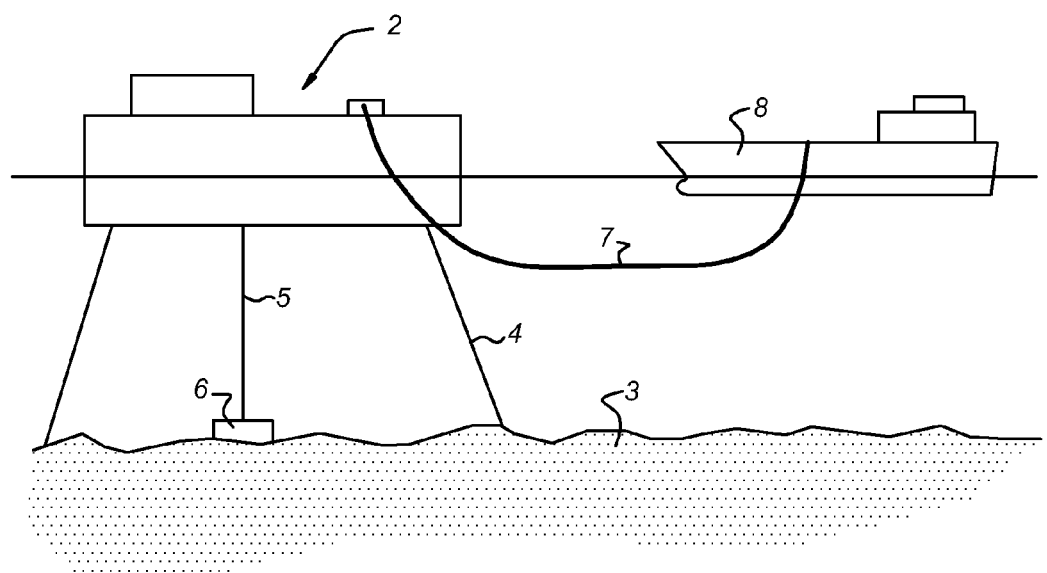

The invention relates to a cryogenic transfer hose, comprising an inner hose and an outer hose situated within at distance from the inner hose wall.

A submersible hose for transfer of crude oil is known from U.S. Pat. No. 3,809,128. In this document the volume of air within the space between the inner and outer hose is selectively controlled for adjusting the buoyancy of the hose. In order to maintain sufficient air space between the inner and outer hose and to prevent the outer hose from collapsing onto the inner hose due to water pressure, a helical spacer member is wound around the outer surface of the inner hose. The hose segments are interconnected via end flanges on the inner hose which project in a length direction beyond the end faces of the outer hose. As the inner hose is not surrounded by the outer hose at the connection flanges, it is exposed to the environment, and hence the known inner hose is not suitable for transporting a cryogenic fluid, such as LNG which may have a temperature of −161° C. or liquid Nitrogen which may have a temperature of −194° C.

From DE 27 05 361 a hose in hose construction of two concentric hydrocarbon ducts, for instance suitable for transfer of LNG, is disclosed in which flexible metal reinforced hoses are used. The inner and outer hose are mutually interconnected via a coupling end flange which is permanently joined to the walls of the inner and outer hoses. The coupling flanges sealingly engage and are interconnected via a plurality of bolts. A fluid passage is present in the coupling flange to allow gas to be circulated in the space between the hoses. The distance between the inner and outer hose is maintained by spacer elements. The known hose has as a disadvantage that the inner hose segments cannot be removed from the outer hose segments for exchange or repair, as in one embodiment the coupling flange is permanently welded to the inner and outer hoses. Furthermore, the inner hoses are detached upon release of the coupling of the outer hoses, such that inspection of the inner hose is not possible without losing its fluid containment properties. In another embodiment the coupling element of the inner hose segments can freely slide in an axial direction which may result in leakage caused by large contractions due to pressure changes and thermal fluctuations.

From U.S. Pat. No. 4,111,466 a pair of concentric hoses is known made of flexible elastomeric material, spaced radially apart to define an annular space around the inner hose. Both hoses are secured at each of their ends to a common connector ring for securing successive lengths of the double hose together. Contraction of the inner hose upon cooling may lead to a leakage path being formed at the inner flanges. Again, decoupling of the connector ring will simultaneously detach both the inner and the outer hoses.

From U.S. Pat. No. 4,108,476 a concentric configuration of rigid pipes is disclosed wherein end parts of the inner pipe are slidingly interconnected and flanges on the outer wall of the inner pipe are clamped between two internal rings of the outer pipe. Hereby the inner and outer pipe segments form integral parts, wherein the inner pipe cannot be removed from the outer pipe for inspection, exchange or repair. Also, release of the outer pipe segments uncouples the inner pipe segments.

It is an object of the present invention to provide a cryogenic transfer hose, which is suitable for marine transfer of cryogenic fluids from a first structure, such as a FPSO to a second structure, such as a carrier, which can be easily installed, repaired and/or exchanged.

It is another object of the invention to provide a cryogenic transfer hose which maintains a fluid tight connection between the hose segments upon expansion and contraction due to pressurisation during use or due to changes in temperature.

It is a further object of the invention to provide a cryogenic transfer hose which can safely bridge a relatively long distance and which can be easily adjusted in length.

It is another object of the present invention to provide a concentric configuration of cryogenic transfer hoses in which the outer hose segments can be detached without losing fluid tight properties of the inner hose.

It is again a further object of the present invention to provide a cryogenic transfer hose of the concentric type which allows relative movements of inner hose relative to the outer hose caused by thermal fluctuations and/or pressurisation of the inner hose while maintaining its fluid tight characteristics.

Hereto the cryogenic transfer hose according the present invention in use extends in a marine environment and having a length of at least 20 m, preferably at least 100 m, comprising:

an inner hose with at least two segments, the inner hose segments being interconnected via at least two inner connecting members extending in a transverse direction, the inner hose being flexible and comprising a flexible reinforced wall having an internal diameter of at least 10 cm, an outer hose surrounding the inner hose and comprising a watertight elastomeric or composite material, the outer hose comprising at least two segments which are mutually connected via two outer connecting members, the outer hose having a wall thickness of at least 2 cm, a bend radius of at least 2 m, and an internal diameter of at least 20 cm, the inner hose being kept at a distance from the outer hose via a number of spacer elements bridging a distance ($h_i$) between the outer wall of the inner hose and an inner wall of the outer hose, which distance is between 0.1 and 0.8 times the internal diameter $d_{io}$ of the inner hose, wherein a longitudinal position of a pair of inner connecting members is situated at or near a longitudinal position of a pair of outer connecting members, wherein the inner connecting members bridge the distance $h_i$ between the inner and outer hose walls and comprise a flange section of the inner hose wall, two transverse abutment surfaces on the outer hose wall are fixed thereto, the flange sections being releasably engaged between the abutment surfaces for preventing relative axial movement between the inner and outer segments at or near the longitudinal position of the pair of outer and inner connecting members in two axial directions upon expansion and contraction of the inner hose segments.

Because the flexible inner hose is axially connected to the outer hose via the connecting members, the inner hose segments can be attached to the outer hose segments in a prestressed manner at ambient temperature. In this way during transfer of LNG, occurring at pressures of for instance 10 bar, the inner hose expands to its normal length due to the pressure. Especially during start up, when the cryogenic inner hose is slowly pressurised by cold gas, axially fixing of the interconnecting parts of the inner and outer hoses relative to one another, prevents leakage of gas along the flanges. By detaching of the interconnecting members the inner and outer hose segments can be removed as an integral unit and, wherein the inner hose segment can be detached and extracted from the outer hose segment on an onshore location for inspection, maintenance or replacement.

In another embodiment, the flange sections are releasable from the inner hose wall and/or wherein the abutment surfaces are releasable from the outer hose wall such that upon removal of the flange sections and/or the abutment surfaces from the gap between the inner hose and outer hose all wall parts of the inner hose are at a distance from the wall of the outer hose.

Because the flange sections of the inner hose are releasable from the inner hose wall and/or the abutment surfaces are releasable from the outer hose wall, the outer hose can be detached from the inner hose without a negative impact on the fluid tight characteristics of the inner hose, which allows for inspection or repair. Furthermore, after detachment of the flange sections and/or abutment surfaces, the inner hose can freely be moved through the outer hose, such that an inner hose section may be extracted from the outer hose for inspection, repair or exchange.

The inner hose is a hose that is particularly suitable for transfer of cryogenic fluids, and is mechanically relatively weak, but is protected by the outer hose, which may be a hose known in itself for transfer of crude oil. The hose-in-hose configuration provides improved safety for the aerial, floating or submerged cryogenic transfer system as the outer hose protects the inner hose against collisions with other hoses, cranes, LNG carriers or other vessels, such as tugs or work boats, and prevents water ingress. The outer hose is relatively stiff compared to the inner hose but still flexible enough to be stored on a vertical or horizontal hose reel on a buoy, tower or on a vessel, or to be stored on board of a vessel in a gutter when not in use.

The segmented execution allows easy assembly of the hose to its desired length. The segments furthermore allow an easy off-shore change-out of a part of the LNG transfer system for inspection, maintenance or repair.

From U.S. Pat. No. 4,417,603 a cryogenic transfer hose is known for connecting an offshore platform to a tanker ship, comprising an inner helical metal spring, an outer helical spring offset by half a pitch and a layer of polymer material between the springs. A heat insulating layer surrounds the inner metal hose. The known cryogenic hose is made up of a single part and needs, in case of failure, be completely replaced. Furthermore, the cryogenic metal hose seems to be relatively vulnerable and is not effectively protected by the outer insulation which is directly attached to the reinforced composite inner hose.

With "cryogenic" as is used herein liquefied gases are intended which temperatures below −60° C., such as LNG which has a temperature of −162° C.

With "flexible reinforced wall" as is used herein, a composite or metal hose wall is included which has flexibility imparted thereto by for instance a bellow-like construction or which has a helical spring-like configuration or similar wall constructions which provide increased flexibility to the hose compared to a flat wall of sheet material.

With "marine" environment as is used herein, a position in use of the hose above the water surface, floating on the water surface, submerged below the water surface or any combination thereof are intended.

With "composite material" a material comprising two or more distinct layers is intended, such as for instance a flexible metal layer, reinforced by textile, rubber, metal wire or combinations thereof.

In one embodiment the flanges of the inner hose are an integral part of the inner hose wall and are received between the legs of an axial fixation ring with a generally U-shaped cross section, the ring being releasably attached to the outer hose wall. In this way, the inner hose segments can easily be assembled independently from the outer hose segments, and can subsequently be connected to the outer hose via the fixation ring. The fixation ring can be seated in a ring-shaped recess on the inside of the outer hose wall. Alternatively, the fixation ring can be attached to the outside hose wall via a pair of annular notches on each side of the ring.

In another embodiment, the inner hose is elongatable and/or contractable in the length direction relative to the outer hose by at least 0.5% of the total hose length due to temperature differences and/or pressurisation of the inner hose, the inner hose not being connected to the outer hose at or near the inner coupling members. The moveable inner hose prevents stresses from building up when LNG is transferred. When no LNG is transferred, the coupling members can be independently aligned for the inner and outer hose in the axial direction, which facilitates assembly and/or exchange of the hose segments under normal environmental conditions.

In order to allow for thermally or pressure induced expansion and contraction of the reinforced inner hose, the inner connector members comprise a sleeve on one inner hose segment and a tubular end part on the other inner hose segment, slidably received within or around the sleeve. The sliding interconnection of the inner hose segments allows expansion and contraction of those hose segments in the length direction, while also being able to be displaced relative to the outer hose.

A composite or metal bellow may be sealingly connected to both inner hose segments, the bellow in a sealing manner engaging with an outer circumferential surface of the inner hose on both sides of an end part of the sleeve. In this way an effective seal is provided around the sliding interconnection of the inner hose segments.

Alternatively, the inner hose may be situated along a curved path within the outer hose, so as to be able to expand in the length direction relative to the outer hose by for instance 0.5-3% of the total length of the outer hose.

In a further embodiment, the connecting members of the inner hose are attached via an attachment member to the connecting members of the outer hose, for properly aligning the inner hose and maintaining it in a defined position relative to the outer hose.

The inner hose can be made of an elongatable material which expands upon pressurisation due to the LNG, which may have a pressure of around 3-4 bar, and may rise to for instance 10 bar. The length extension caused by this may be 3-4%. In one embodiment, the inner hose is pre-stressed prior to axially attaching the inner connecting members to the attachment member of the outer hose, the inner hose when not in use exerting an axially contractive force on the outer hose.

In this way the axial forces exerted by the inner hose on the outer hose when cryogenic fluids are pumped through the inner hose are minimised, while the outer hose is subjected to contractive forces when no cryogenic fluid is transferred through the inner hose. Preferably the outer hose is made of a relatively stiff material to avoid contraction when no load is being transferred.

In order to allow circulation of an insulating medium in the space between the inner and outer hose, such as anti-freeze fluids, inert gases, air or for creating an insulating vacuum, in order to maintain the outer hose at a safe temperature, which is preferably not lower than −60° C., axial passages are provided in the attachment members that bridge the space between the inner and outer hose.

In order to withstand external pressures at a water depth of up to two hundred meters the outer hose may be provided with reinforcement rings.

Figure 2A:
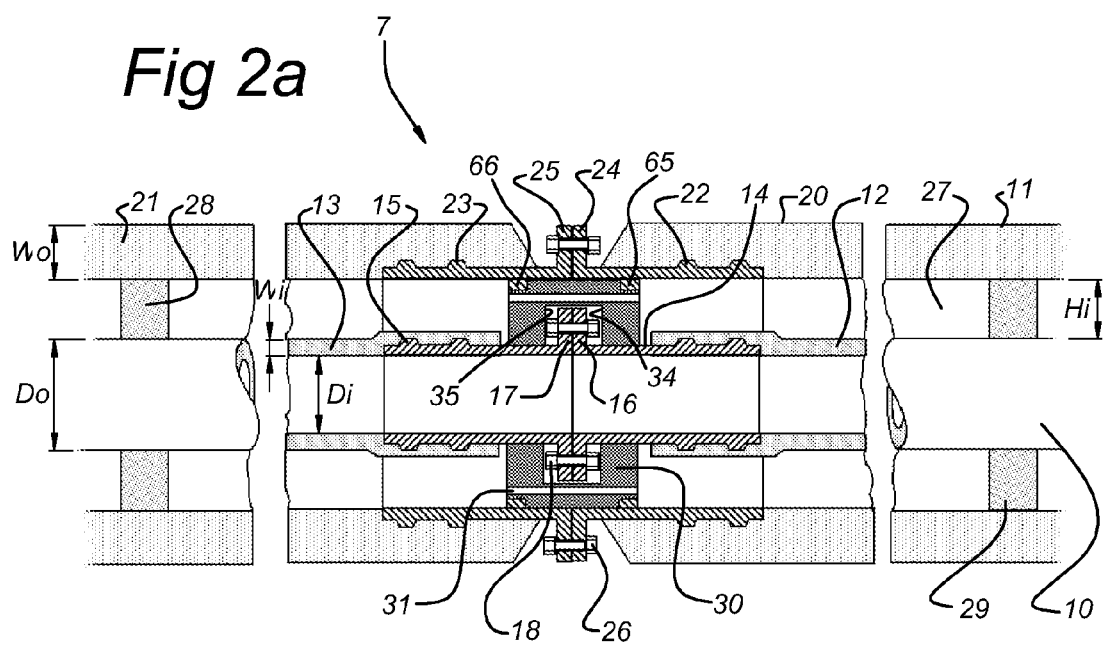
Figure 2B:
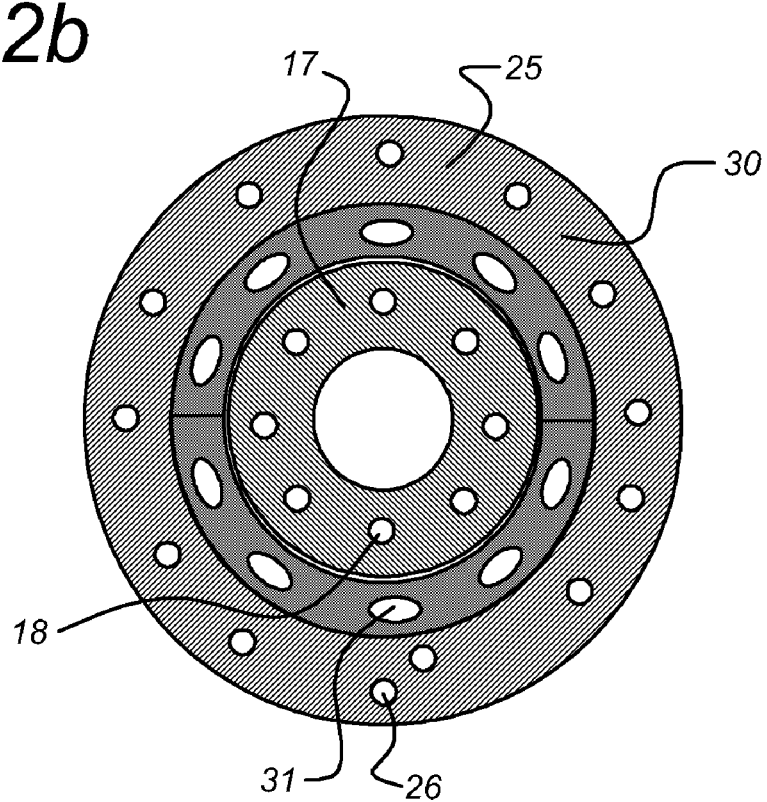
Figure 2C:
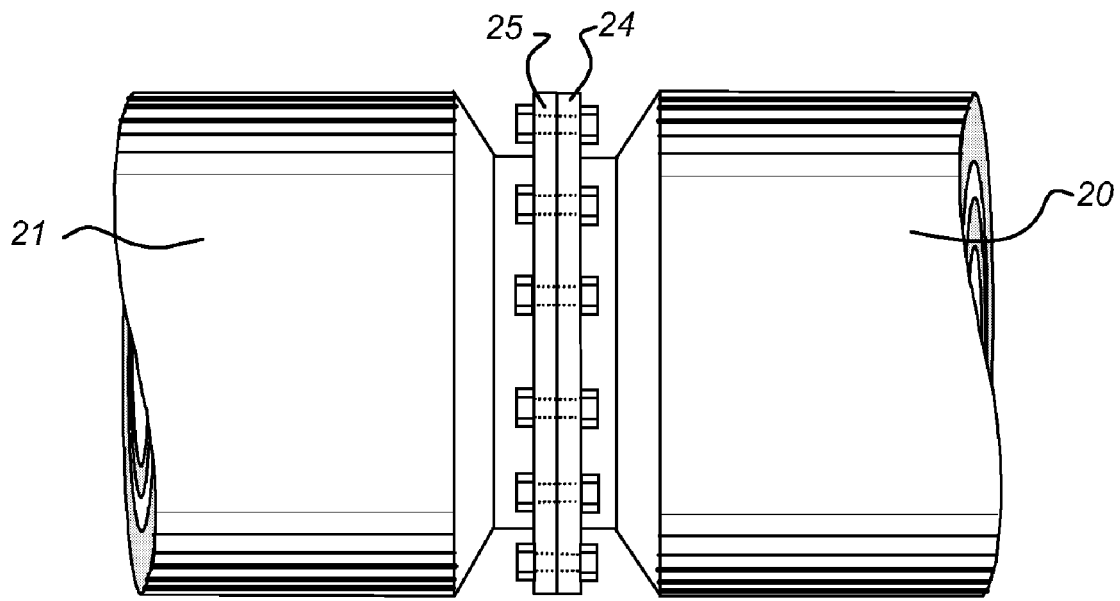
Figure 3:
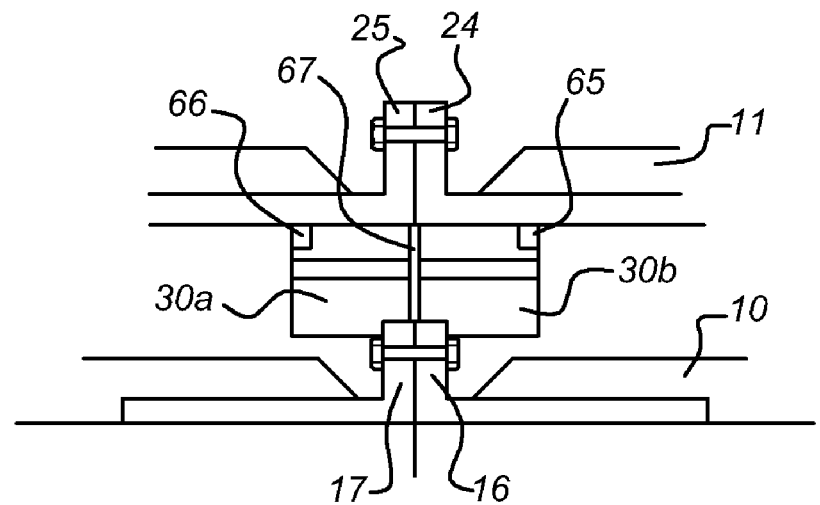
Figure 4:
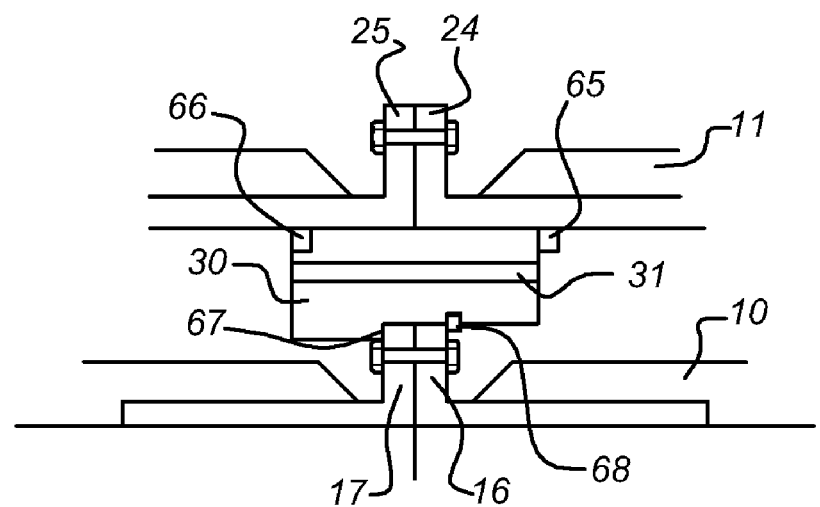
Figure 5:
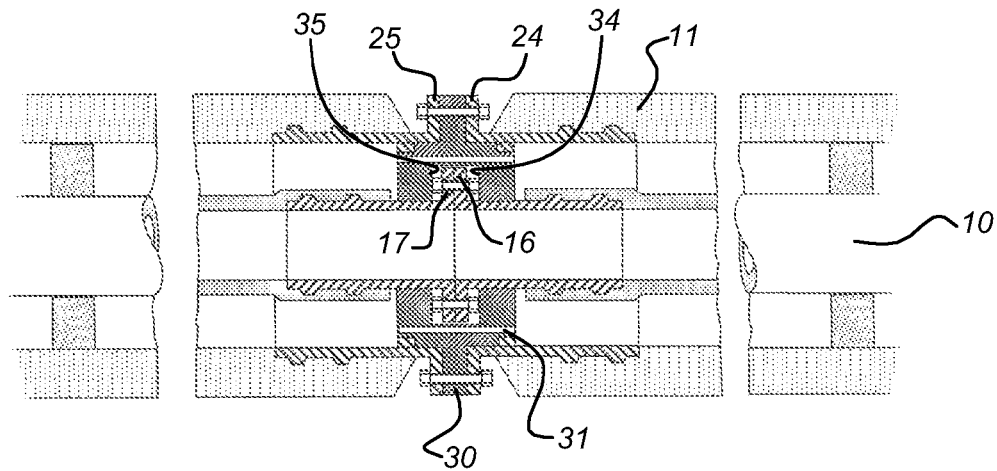
Figure 6A:
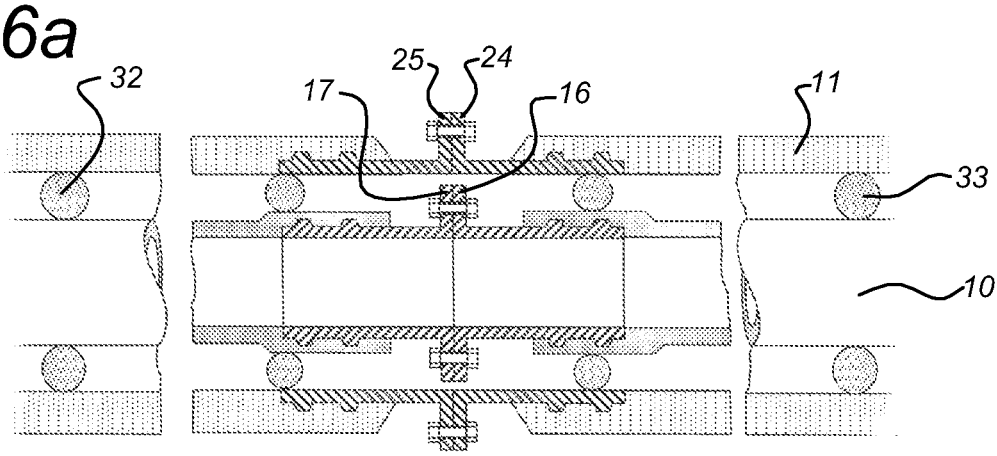
Figure 6B:
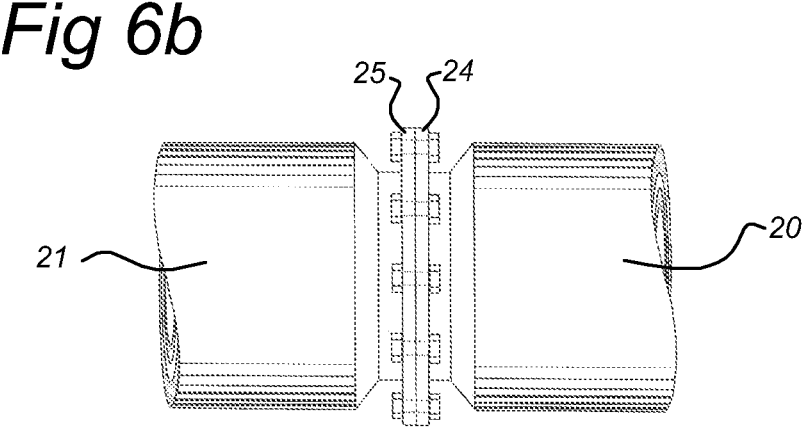
Figure 7A:
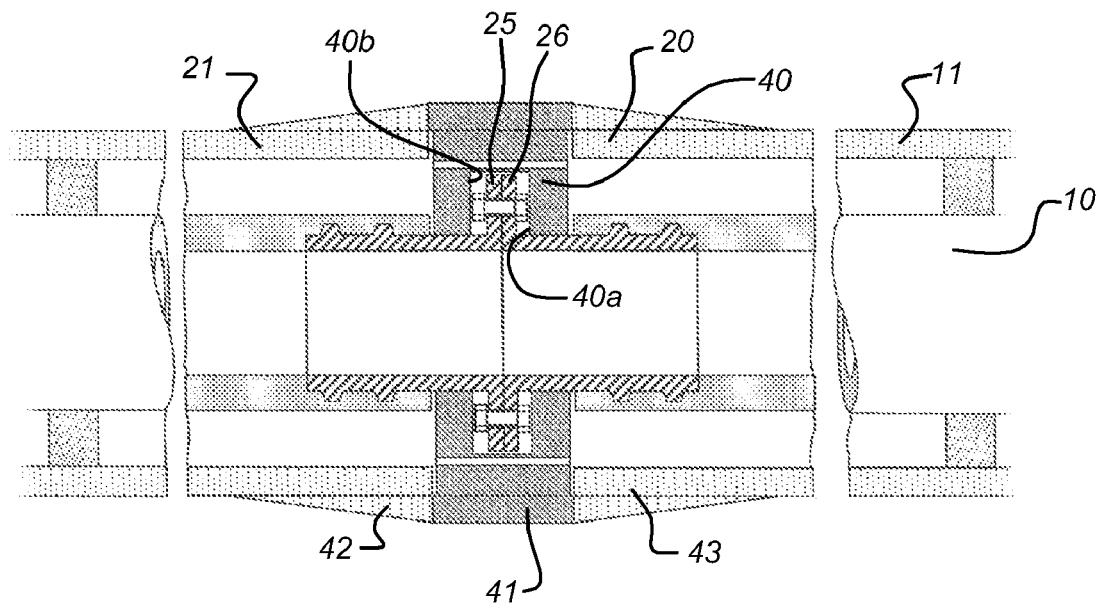
Figure 7B:
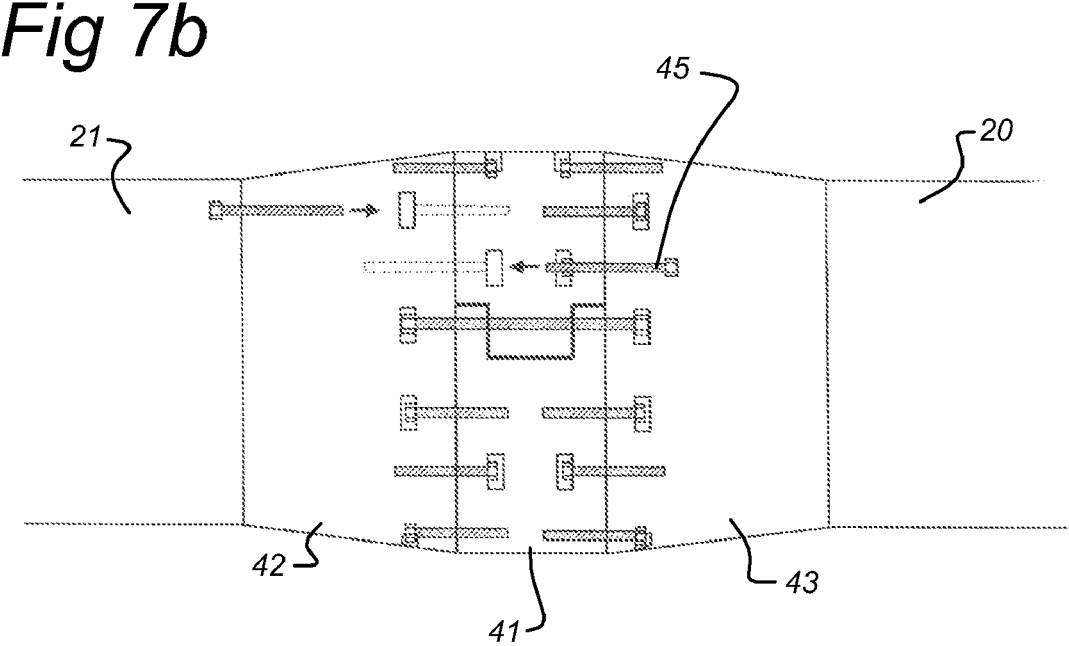
Figure 8A:
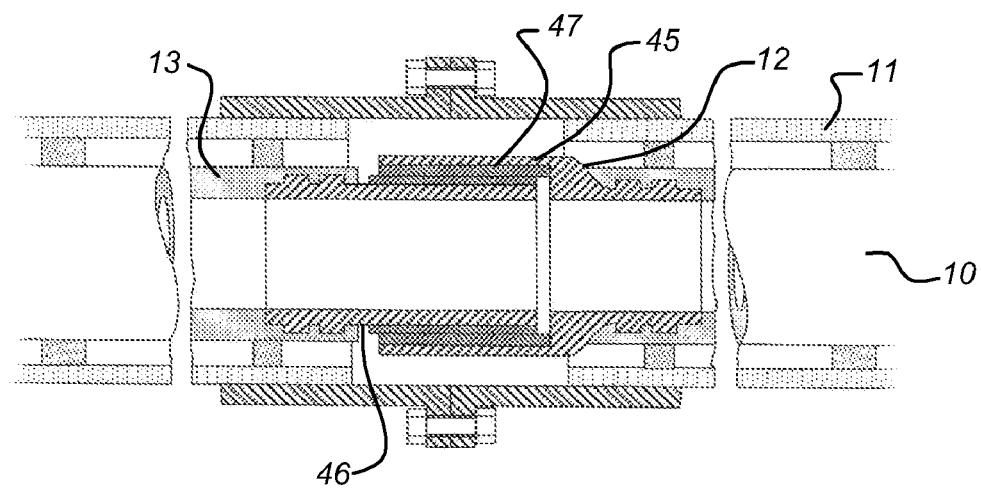
Figure 8B:
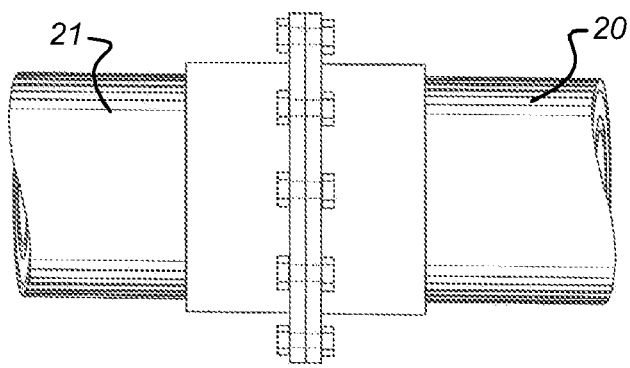
Figure 9:
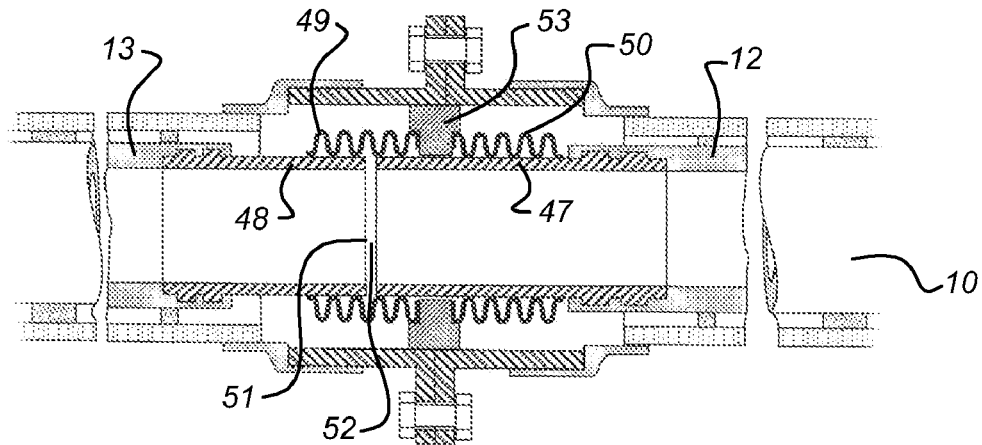
Figure 10:
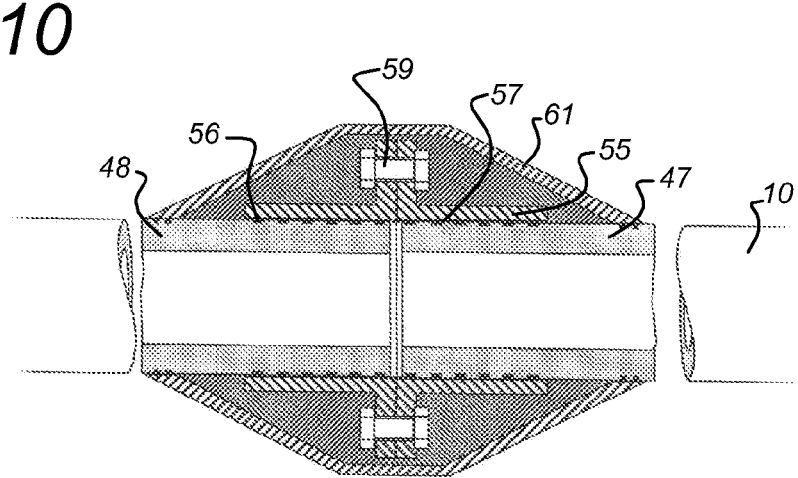
Figure 11:
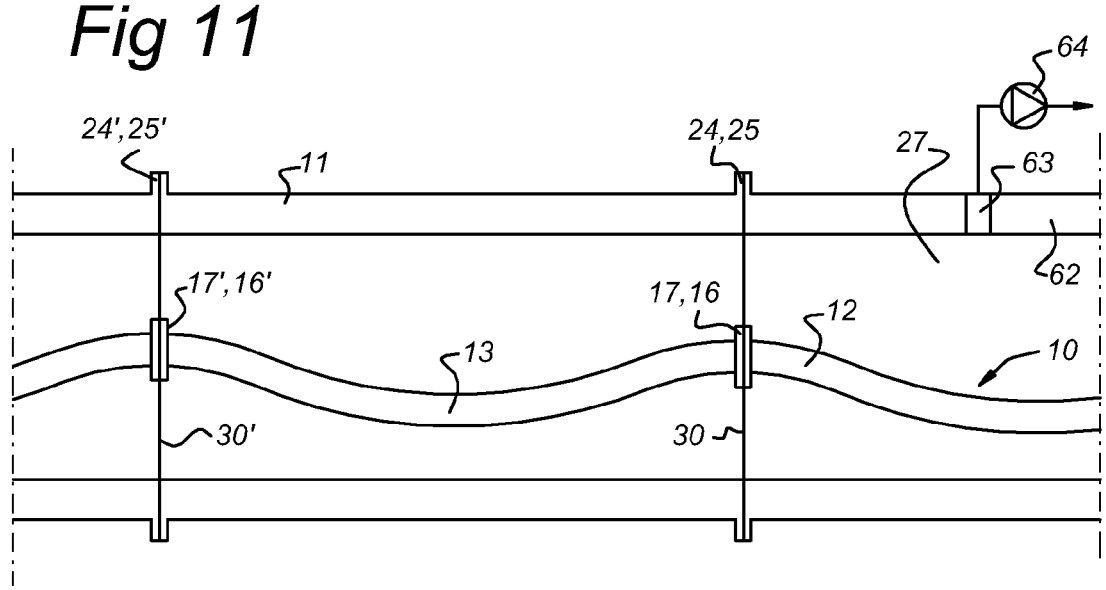
Figure 12:
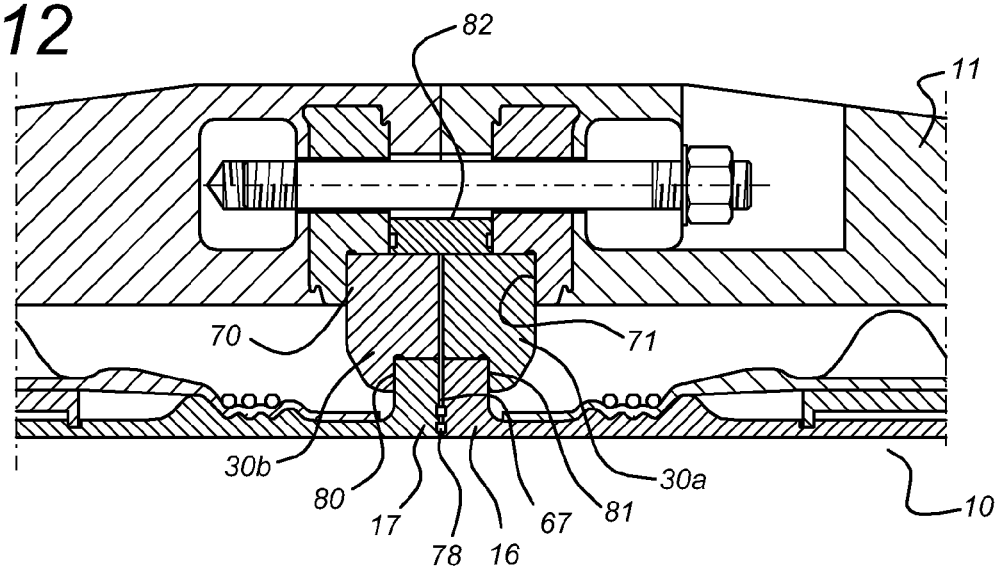
Figure 13:
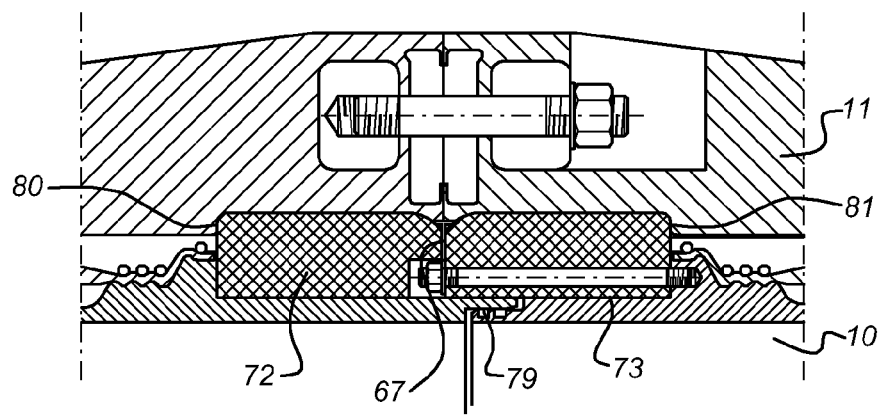
Figure 14:
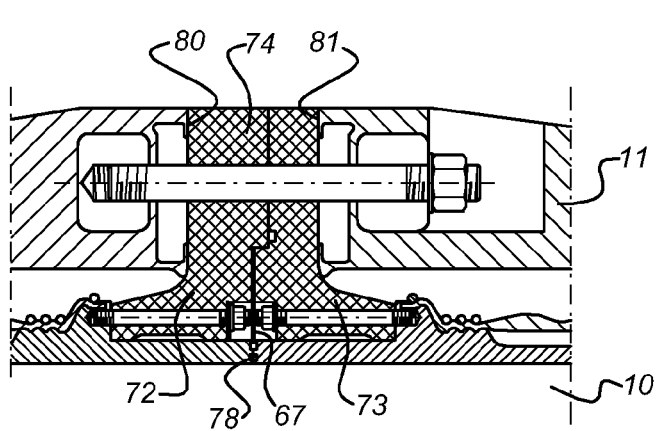

Some embodiments of a flexible cryogenic transfer hose in accordance with the present invention will by way of nonlimiting example be described in detail with reference to the accompanying drawings in the drawings:

FIG. 1 shows a schematic view of an LNG transfer system,

FIGS. 2a, 2b and 2c show a longitudinal cross-sectional view, a transverse cross-sectional view along the line AA and a plan view of a hose-in-hose cryogenic transfer assembly in accordance with the present invention, respectively, FIG. 3 shows an embodiment wherein connecting flanges of the inner hose clamped between two spacer halves, FIG. 4 shows an embodiment wherein the connecting flanges of the inner hose are abutting against a shoulder of a spacer member, FIG. 5 shows a longitudinal cross-sectional view of an embodiment wherein the connecting flanges of the inner hose are coupled to the connecting flanges of the outer hose, FIGS. 6a and 6b show a longitudinal cross-sectional view and a plan view respectively of an inner hose which is movable in the length direction relative to the outer hose, FIGS. 7a and 7b show a longitudinal cross-sectional view and a plan view respectively of an embodiment wherein a spacer is constructed around the flanges of the inner hose, FIGS. 8a and 8b show a longitudinal cross-sectional view and a plan respectively of an embodiment wherein the inner hose comprises a slidable connecting member, FIG. 9 shows a longitudinal cross sectional view of a sliding connecting member of the inner hose comprising a sealing bellow, FIG. 10 shows a longitudinal cross sectional view of a clamping connecting member of the inner hose comprising a number of face seals, FIG. 11 shows a schematic longitudinal cross sectional view of an inner hose extending along curved trajectory within the outer hose, so as to be elongatable, and FIG. 12-14 show different embodiments of a releasable coupling between the inner and outer hose segments.

In FIG. 1 an offshore production unit 1, comprising for instance a FSRU (floating storage and regasification unit) 2 is shown, which is anchored to the sea bed 3 via anchor lines 4. Via a product riser 5, hydrocarbons, such a natural gas, are transported from a sub sea well 6 to be processed in the FSRU 2. The FSRU 2 comprises a liquefaction plant, which cools and liquefies the natural gas to LNG at a temperature of −161° C. The LNG is transferred through a cryogenic transfer hose 7, which is submerged in this embodiment, but which may also completely or partly be an aerial hose or which may float on the water surface, to a midship manifold of an LNG carrier 8 where it is offloaded at a midship offloading position. The cryogenic transfer hose 7 is flexible, in the sense that it can bend to a bend radius of for instance 10 m or more, preferably about 3 m or more. When not in use, the hose 7 may be wound on a horizontal or vertical reel, or be stored on deck of the FSRU 2.

The hose 7 is made up from interconnected segments and comprises an inner reinforced hose conveying the LNG and an outer hose of reinforced elastomeric or another composite material protecting the outer hose from sea water and providing mechanical strength and protection to the combined hoses. It also provides a safety barrier in case of inner hose failure and during testing and transport of the segments.

In FIG. 2 the segments of the inner hose 10 and outer hose 11 are shown in greater detail. The inner hose 10 comprises segments 12 and 13 which are interconnected via a connecting part 14,15 comprising flanges 16, 17 connected via bolts 18. The outer hose 11 comprises segments 20, 21 that are interconnected via connecting parts 22, 23, which comprise flanges 24, 25 connected by bolts 26. The segments of the inner hose and outer hose may for instance have a length of 10 m but need not be of the same length. The segments of the inner hose may for instance have a length of 20 m while the outer hose segments have a length of 10 m, or vice versa.

The space 27 between the outer hose 11 and the inner hose 10 is bridged by spacers 28, 29 which are supported on the outer surface of the inner hose 10 and/or on the inner surface of the outer hose 11. A spacer 30, i.e., axial fixation ring, is arranged around the flanges 16,17 of the inner connecting member, and fixes the position of the inner flanges 16,17 with respect to the outer flanges 24 25 thereby fixing hose 11 to hose 10 while allowing a small motion of the inner hose 10 in the length direction. The spacer 30 is attached to the inner wall of the outer hose 11 by retainers 65,66 which may be rings welded to the inner wall of the outer hose. The spacer 30 comprises abutment surfaces 34,35 situated on either side of the inner hose flanges 16,17 without being fixedly connected to the inner hose 10. A passage 31 is provided in the spacer 30 for allowing circulation of gases such as inert gas or air, in the length direction of the hoses 10,11.

The inner diameter (Do) of the outer hose may range from 20 cm to 100 cm whereas the wall thickness (Wo) of the outer hose 11 can be between 2 cm and 15 cm. The inner diameter (Di) of the inner hose 10 is between 10 cm and 60 cm, while the width (Hi) of the annular space 27 is between 2 cm and 20 cm. The wall thickness (Wi) of the inner hose may be between 1 cm and 15 cm.

The inner hose 10 may be a flexible cryogenic corrugated metal hose such as described in Konrad Friedrichs, Fritz Papmahl and Herbert Backhaus, Offshore Technology Conference 3844 of May 5-8 1980, or a coiled chrome nickel steel reinforced composite hose as described in U.S. Pat. No. 4,417,603 and in WO 01/96772.

The outer hose 11 may be a hose used for transfer of crude oil such as manufactured by Trelleborg AB, Trelleborg, Sweden under the tradename Trelline, by Dunlop Oil and Marine, North East Lincolnshire, United Kingdom under the tradename Dunlop, or manufactured by Coflexip SA, Paris, France. The outer hose 11 is due to its construction and the use of reinforced elastomeric material, much stiffer than the inner cryogenic hose 10. The outer hose protects the inner hose from environmental forces and absorbs over 50%, preferably over 95%, of the axial forces acting on the assembly of inner hose 10 and outer hose 11 during loading or offloading.

The annular space 27 serves to insulate the elastomeric outer hose 11 from the cold inner hose 10 and may be filled with anti-freeze fluids, inert gases, dehydrated air, gel, flexible foams or may be evacuated. The use of an inert gas within the enclosed space 27 will create a vacuum when LNG transport through the inner hose causes the inert gas to be liquefied. Also air might be circulated in the space 27 in order to ensure that the outer hose 11 is maintained at a safe relatively high temperature and the space 27 can be used for leak detection purposes. The air might be pressurised to just above the pressure of the transferred LNG to avoid leakage of LNG into the space 27 in case the inner hose is damaged.

The spacers 28, 29 which keep the inner and the outer hoses 10,11 more or less co-axial are made of an insulating material, for instance available under the tradename "Tufol" manufactured by a plastic or ceramic material, but may be replaced by a foam or a gel, or one or more tightly wound helical plastic pipes which may be compressible to allow relative movement or displacement of the inner hose with regard to the outer hose, due to differences in temperature induced contraction upon LNG transfer. Such a construction is described in detail in U.S. Pat. No. 3,809,128. The spacers 28, 29 can be locked into position by retainers which for example can be rings welded to the outer hose wall so to fix the position of the spacers 28,29 and by that the position of the inner hose flanges.

As shown in FIG. 2b, the spacer 30 is formed of two half cylinders which can be placed around the outer diameter of the inner hose 10. The spacer 30 can be made of an insulating material for instance available under the tradename "Tufnol" manufactured by Tufnol Composites Ltd, Birmingham, United Kingdom.

In FIG. 3, a construction is shown in which the spacer 30 is made up of two halves 30a, 30b, that are separated along a vertical line 67. The two halves 30a, 30b are compressed in a sealing manner by the by the retainers 65,66 when the outer hose is assembled via the flanges 24,25. Hereby a gas tight vent port or passage 31 is formed while the axial position of the inner hose 10 is secured by the flanges 16,17 being clamped between the spacer halves 30a,30b.

In the embodiment of FIG. 4, the spacer 30 comprises a single piece in the axial direction, and engages with the flanges 16,17 on the inner hose 10, via a shoulder 67 and a snap ring 68.

In the embodiment of FIG. 5, the spacer 30 is made of an insulation material and is rigidly connected to the flanges 24, 25 of the outer hose 11, such that the axial and radial positions of the inner hose 10, especially at the flanges, is determined accurately in relation to the outer hose. The advantage is that if the flanges of the outer hose segments need to be opened for repair or maintenance, the flanges of the inner hose are also directly accessible as they cannot shift or be displaced within the outer hose during use in a dynamic marine environment. In this embodiment, the outer hose 11 will take up most of the axial loads.

In the embodiment shown in FIGS. 6a and 6b, the inner hose 10 is not fixed to the outer hose 11 at the position of the outer flanges 24,25, and inner flanges 16 and 17. The spacers 32,33 have a rounded shape, for instance in the form of balls, that is adapted to allow axial movement of the inner and outer hoses 10,11 to avoid stress caused by thermally or pressure induced contraction and expansion.

In the embodiment of FIGS. 7a and 7b, the spacer 40 functions to radially position the inner hose 10 within the outer hose 11, but also to axially position the outer hose segments 20,21 relative to the inner hose by the abutment surfaces 40a, 40b on the spacer 40 enclosing the flanges 24,25 of the inner hose. A coupling ring 41 is inserted between two bevels 42, 43 of the outer hose 11 and is connected to the bevels via axial bolts 45, as is shown in FIG. 6b.

In the embodiments of FIGS. 8a and 8b, the segment 12 of the inner hose 10 comprises a sleeve 45 in which the end part of segment 13 is slidably received. Seals are provided between the two sliding surfaces to ensure a leakage free fitting. The inside of the sleeve 45 and the outside of the end part of segment 13 are coated with a slidable material, such as polypropylene or Teflon. Again, retainers fixed to the inside of the hose 11 can be added to limit the sliding distance.

In the embodiment of FIG. 9, the end parts 47, 48 of the segments 12, 13 of the inner hose 10 are provided with a sealing bellow 49,50 which is placed around the end parts 147, 48, and extends past the end openings 51, 52 of the segments to sealingly engage a still sealing ring 53.

In the embodiment of FIG. 10, the end parts 47, 48 of the segments 12, 13 of the inner hose 10 are placed in a clamping sleeve 55 which sealingly engages, via a number of sealing rings 56, 57 the boundary surface of the inner hose 10. The flange 59 of the clamping sleeve 55 is surrounded by an insulating material 60 and a protective jacket 61.

In the embodiment of FIG. 11 it is shown that the inner hose 10 has a curved path within the (straight) outer hose 11, the inner hose 10 being connected to the outer hose 11 at the positions of the flanges 16, 16' 17, 17' and 24, 24', 25, 25' via the spacers 30, 30'. This allows elongation and contraction of the inner hose relative to the outer hose.

In the wall 62 of the outer hose 11 a passage 63 is provided, connected to a pump 64 for instance for applying a vacuum or for circulation of air, noble gases and the like in the space 27.

FIG. 12 shows an embodiment wherein the inner flanges 16,17 of the inner hose 10 are locked between the halves 30a, 30b of the spacer 30, which in an axial direction engages with an upper part 70 against a shoulder 71 in the outer hose 11 so as to transfer the contractive forces which are for instance due to pre-loading of the inner hose 10, to the outer hose 11. The abutment surfaces 80,81 of the spacer 30 engage with the inner flanges 16,17. A double face seal 78 is incorporated between the inner flanges 16,17. The double face seal 78 preferably comprises a high-pressure metal seal which are inserted into the gap between the spacer halves 30a,30b, which do not touch one another. In this way, the clamping forces from the bolts in the outer hose are directly transferred to the inner hose flanges 16,17. A steel/rubber sealing ring 82 on top of the spacer halves 30a, 30b prevents ingress of seawater into the gap between the spacer halves.

In the embodiment of FIG. 13, the inner hose 10 has connecting flanges formed by the thermally isolating ring members 72,73 attached to the inner hose wall. A double piston seal 79 is placed between the abutting segments of the inner hose 10. The abutment surfaces 80,81 engage with a shoulder of a recess in the outer hose wall.

In the embodiment of FIG. 14, the ring members 72,73 radially extend in between the walls of the outer hose 11, to which they are connected via bolts 74.

In this case, the abutment surfaces 80,81 are part of the outer hose wall.

The invention claimed is:

1. A flexible cryogenic transfer hose (7) for connecting two cryogenic facilities, the hose in use extending in a marine environment and having a length of at least 20 m, comprising:
   an inner hose (10) with at least two segments (12,13), the inner hose segments being interconnected via at least two inner connecting members (16,17;30;30a,30b;70; 71;72,73) extending in a transverse direction, the inner hose being flexible and comprising a flexible reinforced wall having an internal diameter of at least 10 cm; and
   an outer hose (11) surrounding the inner hose and comprising a watertight elastomeric or composite material, the outer hose comprising at least two segments (20,21) which are mutually connected via two outer connecting members (24,25), and the outer hose having a wall thickness of at least 2 cm, a bend radius of at least 2 m, and an internal diameter of at least 20 cm,
   wherein the inner hose is kept at a distance from the outer hose via a number of spacer elements (28,29) bridging a distance (Hi) between the outer wall of the inner hose and an inner wall of the outer hose, which distance is between 0.1 and 0.8 times the internal diameter (Di) of the inner hose (10),
   wherein a longitudinal position of a pair of inner connecting members (16,17;30;30a,30b;70;71;72,73) is situated at or near a longitudinal position of a pair of outer connecting members (24,25),
   wherein the inner connecting members (16,17;30;30a,30b; 70;71;72,73) bridge the distance (Hi) between the inner and outer hose walls and comprise a flange section (16, 17,72,73) of the inner hose wall, two transverse abutment surfaces (34,35,80,81) on the outer hose wall or fixed to the outer wall, the flange sections (16,17,72,73) being releasably engaged between the abutment surfaces (34,35,80,81) for preventing relative axial movement between the inner and outer segments (12,13;20, 21) at or near the longitudinal position of the pair of outer and inner connecting members in two axial directions upon expansion and upon contraction of the inner hose segments, and wherein the flange sections (72,73) are releasable from the inner hose wall and/or wherein the abutment surfaces (34,35,80,81) are releasable from the outer hose wall such that upon removal of the flange sections (72,73) and/or the abutment surfaces (34,35,80,81) from the gap between the inner hose (10) and outer hose (11), and all wall parts of the inner hose (10) are at a distance from the wall of the outer hose (11).

2. The flexible cryogenic transfer hose (7) according to claim 1, wherein the flanges of the inner hose are an integral part of the inner hose wall and are received between the legs of an axial fixation ring with a generally U-shaped cross section, the ring being releasably attached to the outer hose wall.

3. The flexible cryogenic transfer hose (7) according to claim 2, wherein the fixation ring is seated in a ring-shaped recess on the inside of the outer hose wall.

4. The flexible cryogenic transfer hose (7) according to claim 2, wherein the fixation ring is attached to the outside hose wall via an pair of annular notches on each side of the ring.

5. The flexible cryogenic transfer hose (7) according to claim 1, wherein the inner hose is situated along a curved path relative to the outer hose.

6. The flexible cryogenic transfer hose (7) according to claim 1, further comprising a metal bellow (49) being sealingly connected to both inner hose segments (12, 13), the bellow in a sealing manner engaging with an outer circumferential surface of the inner hose on both sides of an end part (51, 52) of the segments (12, 13).

7. The flexible cryogenic transfer hose (7) according to claim 1, wherein the inner hose is subjected to an axial pull force, prior to axially attaching the inner connecting members (16,17;30a,30b;72,73) to the outer hose (11), the inner hose (10) when not in use exerting an axially contractive force on the outer hose (11).

8. The flexible cryogenic transfer hose (7) according to claim 1, wherein the outer hose (11) is stiffer than the inner hose (10) so as not be buckled by contraction of the inner hose after release of the axial pull force.

9. The flexible cryogenic transfer hose (7) according to claim 1, wherein the length of the hose is at least 100 m.

* * * * *